United States Patent
Newman

(10) Patent No.: US 10,853,676 B1
(45) Date of Patent: Dec. 1, 2020

(54) VALIDATING IDENTITY AND/OR LOCATION FROM VIDEO AND/OR AUDIO

(71) Applicant: Wells Fargo Bank, N.A., San Francisco, CA (US)

(72) Inventor: David Newman, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/297,997

(22) Filed: Mar. 11, 2019

Related U.S. Application Data

(63) Continuation of application No. 15/205,939, filed on Jul. 8, 2016, now Pat. No. 10,275,671.

(60) Provisional application No. 62/192,416, filed on Jul. 14, 2015.

(51) Int. Cl.
*G06K 9/00* (2006.01)
*G10L 17/02* (2013.01)
*G10L 17/04* (2013.01)
*G10L 25/24* (2013.01)

(52) U.S. Cl.
CPC .......... *G06K 9/00892* (2013.01); *G10L 17/02* (2013.01); *G10L 17/04* (2013.01); *G10L 25/24* (2013.01)

(58) Field of Classification Search
CPC ..... G06K 9/00892; G10L 25/24; G10L 17/02; G10L 17/04
See application file for complete search history.

(56) References Cited

U.S. PATENT DOCUMENTS

| | | | |
|---|---|---|---|
| 7,751,597 B2 | 7/2010 | Gabara | |
| 7,949,535 B2 | 5/2011 | Ohta et al. | |
| 8,447,273 B1 | 5/2013 | Friedlander et al. | |
| 8,868,223 B1 * | 10/2014 | Sharifi | G06F 16/683 700/94 |
| 9,014,666 B2 | 4/2015 | Bentley et al. | |
| 9,148,742 B1 * | 9/2015 | Koulomzin | H04W 4/00 |
| 9,299,350 B1 * | 3/2016 | Dumont | G06K 9/00315 |
| 9,652,667 B2 | 5/2017 | MacMillan et al. | |
| 9,734,870 B2 | 8/2017 | Sievert et al. | |
| 10,275,671 B1 * | 4/2019 | Newman | G10L 17/22 |
| 2003/0065805 A1 * | 4/2003 | Barnes, Jr. | G06Q 30/0283 709/231 |
| 2007/0140644 A1 | 6/2007 | Gabara | |
| 2007/0222734 A1 | 9/2007 | Tran | |

(Continued)

OTHER PUBLICATIONS

Lei et al., "Multimodal City-Verification on Flickr Videos Using Acoustic and Textual Features", IEEE, 4 pages, 2012.

(Continued)

*Primary Examiner* — Aaron W Carter
(74) *Attorney, Agent, or Firm* — Merchant & Gould P.C.

(57) ABSTRACT

An electronic computing device includes a processing unit and system memory. The system memory includes instructions which, when executed by the processing unit, cause the electronic computing device to: receive a communication containing audio data; automatically identify one or more sounds in the audio data of the communication that can be correlated with a geographical location; use the identification of the one or more sounds to identify the geographical location for the audio data; and verify an identity of an individual using the geographic location from the audio data.

20 Claims, 6 Drawing Sheets

(56) References Cited

U.S. PATENT DOCUMENTS

| | | | |
|---|---|---|---|
| 2008/0002882 A1* | 1/2008 | Voloshynovskyy | ... G07D 7/005 382/181 |
| 2009/0119190 A1* | 5/2009 | Realini | ........... G06Q 20/04 705/30 |
| 2011/0119297 A1 | 5/2011 | Rango et al. | |
| 2011/0135152 A1 | 6/2011 | Kashiwagi | |
| 2011/0255736 A1 | 10/2011 | Thompson et al. | |
| 2011/0285807 A1 | 11/2011 | Feng | |
| 2012/0014567 A1 | 1/2012 | Allegra et al. | |
| 2012/0140993 A1 | 6/2012 | Bruso et al. | |
| 2012/0232981 A1 | 9/2012 | Torossian et al. | |
| 2012/0233072 A1* | 9/2012 | Calman | ........... G06Q 40/02 705/44 |
| 2013/0015946 A1 | 1/2013 | Lau et al. | |
| 2013/0030682 A1 | 1/2013 | Chakra et al. | |
| 2013/0227651 A1 | 8/2013 | Schultz et al. | |
| 2013/0262873 A1 | 10/2013 | Read et al. | |
| 2014/0046844 A1* | 2/2014 | Grigg | ........... G06Q 20/20 705/44 |
| 2014/0161270 A1 | 6/2014 | Peters et al. | |
| 2014/0279303 A1* | 9/2014 | van Dam | ........... G06Q 40/12 705/30 |
| 2014/0280318 A1* | 9/2014 | Simms | ........... G06F 16/29 707/769 |
| 2014/0315574 A1* | 10/2014 | Shakespeare | ...... H04W 64/00 455/456.1 |
| 2015/0026785 A1 | 1/2015 | Soon-Shiong | |
| 2015/0128240 A1* | 5/2015 | Richards | ........ H04W 12/0608 726/7 |
| 2015/0206128 A1 | 7/2015 | Torossian et al. | |
| 2015/0230086 A1 | 8/2015 | Bentley et al. | |
| 2015/0256808 A1 | 9/2015 | MacMillan et al. | |
| 2015/0281710 A1 | 10/2015 | Sievert et al. | |
| 2015/0310434 A1 | 10/2015 | Cheung | |
| 2016/0005435 A1 | 1/2016 | Campbell et al. | |
| 2016/0029105 A1 | 1/2016 | Newman et al. | |
| 2016/0055381 A1 | 2/2016 | Adsumilli et al. | |
| 2016/0196852 A1 | 7/2016 | Sievert et al. | |
| 2016/0337548 A1* | 11/2016 | Osborn | ............... G06F 16/5866 |
| 2016/0343107 A1 | 11/2016 | Newman et al. | |
| 2017/0091764 A1* | 3/2017 | Lloyd | ................ G06Q 20/3224 |
| 2017/0091765 A1* | 3/2017 | Lloyd | .................... G06Q 20/32 |
| 2017/0110155 A1 | 4/2017 | Campbell et al. | |
| 2017/0278195 A1* | 9/2017 | Washio | ................... G06F 21/32 |
| 2018/0025402 A1* | 1/2018 | Morris | ............... G06Q 30/0611 705/80 |
| 2018/0150922 A1* | 5/2018 | Lyman | ............... G06O 30/0215 |
| 2019/0287083 A1* | 9/2019 | Wurmfeld | ............... G06F 3/017 |
| 2020/0005262 A1* | 1/2020 | Arora | ................ G06Q 20/3224 |
| 2020/0005295 A1* | 1/2020 | Murphy | ............... G06Q 20/204 |

OTHER PUBLICATIONS

Hays et al., "Large-Scale Image Geolocalization", Chapter 3 of "Multimodal Location Estimation of Videos and Images", pp. 41-62, Available Online Oct. 5, 2014.
Lei et al. "Application of Large-Scale Classification Techniques for Simple Location Estimation Experiments", Chapter 6 of "Multimodal Location Estimation of Videos and Images", Available Online Oct. 5, 2014.
Liu et al. "Vision-Based Fine-Grained Location Estimation", Chapter 4 of "Multimodal Location Estimation of Videos and Images", pp. 63-83, Available Online Oct. 5, 2014.
Facebanx, "The natural way to identify your customers"—http://facebanx.com, downloaded Apr. 8, 2015 (10 pages).
Solutions/One Visage/the Selfie Authentication Company, http://onevisage.com/ovi-solutions/[Apr. 8, 2015 1:41:58 PM] (3 pages).
Jaeyoung Choi and Gerald Freidland, "Multimodal Location Estimation of Videos and Images, © Springer International Publishing, Switzerland, 2015, Chapter 6—Application of Large-Scale Classification Techniques for Simple Location Estimation Experiments," 17 pages.
Remesh Jain, "Semantically Linked Photos for building Visual Web," http://www.slideshare.net/jain49/icsc-2015-semantic-links-in-visual-web-150210, Dept. of Computer Science, University of California, Irvine, jain@ics.uci.edu, Feb. 14, 2015, 35 pages.

* cited by examiner

404 →

502 — Produce acoustic feature vectors from audio signal

504 — Create training dataset model

506 — Generate similarity scores for acoustic feature vectors for cities in training dataset model 508 — Identify geographical location from similarity scores

FIG. 5

VALIDATING IDENTITY AND/OR LOCATION FROM VIDEO AND/OR AUDIO

BACKGROUND

Many life situations require that a person's identity be authenticated. Examples of such life situations can include passing a security check at an airport, logging into a computer system and conducting a financial transaction. Authentication can take different forms, for example a picture ID, a password, a security code or a biometric authentication method such as a fingerprint, a voice print or a retinal scan.

During authentication of a person's identity, it can be useful to determine a current location of the person. For example, credit card companies can become suspicious of a series of transactions when a person makes credit card transactions from different geographical locations within a short time frame.

SUMMARY

Embodiments of the disclosure are directed to an electronic computing device comprising: a processing unit; and system memory, the system memory including instructions which, when executed by the processing unit, cause the electronic computing device to: receive a communication containing audio data; automatically identify one or more sounds in the audio data of the communication that can be correlated with a geographical location; use the identification of the one or more sounds to identify the geographical location for the audio data; and verify an identity of an individual using the geographic location from the audio data.

In another aspect, a computer-readable data storage memory includes instructions that, when executed by a processing unit of an electronic computing device, cause the processing unit to: receive a communication containing audio data and video data; automatically identify one or more sounds in the audio data of the communication that can be correlated with a geographical location; automatically identify one or more video images from the video data that can be correlated with the geographical location; use the identification of the one or more sounds and the one or more video images to identify a common geographical location for the audio data and the video data; and verify an identity of an individual based at least in part upon the common geographic location for the audio data and the video data.

In yet another aspect, a method includes: receiving a communication containing audio data; automatically identifying one or more sounds in the audio data of the communication that can be correlated with a geographical location; using the identification of the one or more sounds to identify the geographical location of where the audio data was created, the identification of the geographical location comprising: sampling the audio data and extracting one or more Mel Frequency Cepstral Coefficient (MFCC) vectors from the audio data; creating a dataset for a city using the MFCC vectors, the dataset being based on a Gaussian Mixture Model (GMM); comparing the dataset created using the MFCC vectors with other datasets that are correlated with specific cities; and when a determination is made that the dataset created using the MFCC vectors is correlated with a specific location, designating the specific location as the geographical location for the audio data; and verifying, at least in part, an identity of an individual based upon the specific location.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows a flowchart for an example method for automatically identifying sounds in audio data that can be correlated with a geographical location.

DETAILED DESCRIPTION

Figure 1:
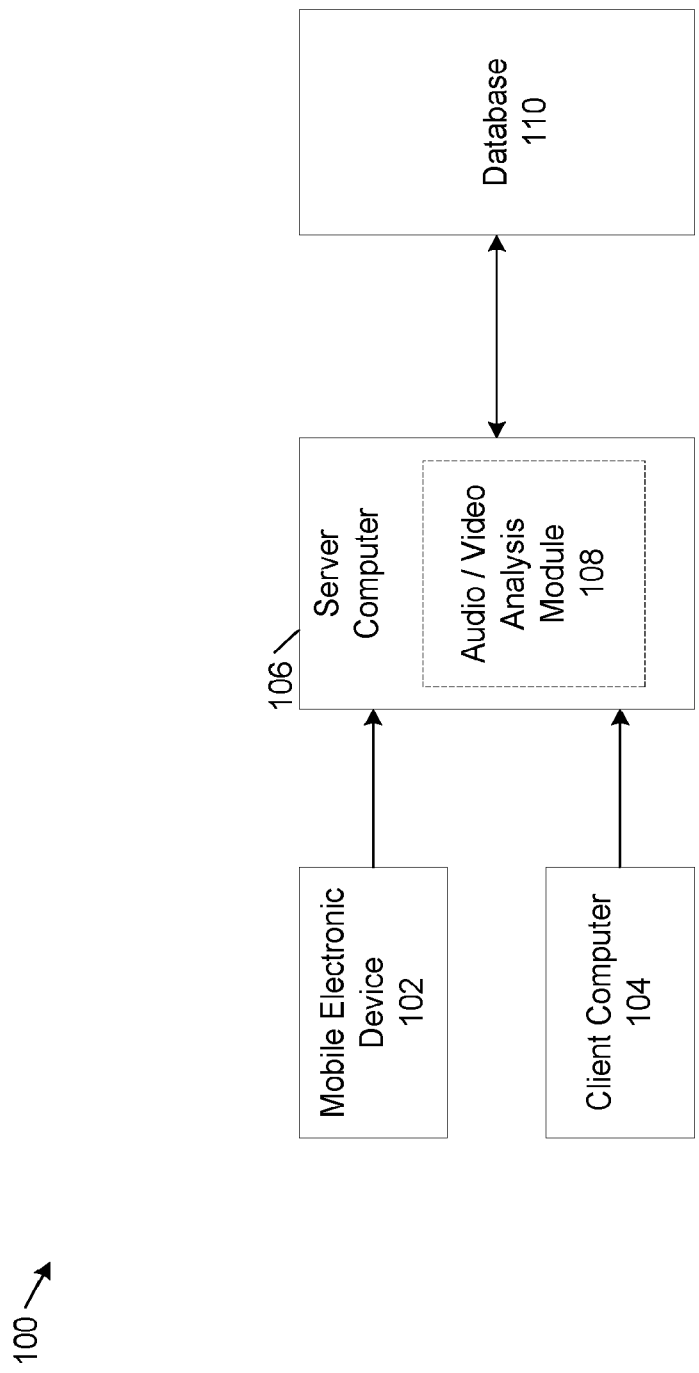
FIG. 1 shows an example system that supports validating a user's identity and location from audio and video data.

The present disclosure is directed to systems and methods for identifying a person and a location for the person from video or audio.

Using the systems and methods, one or more audio and visual "fingerprints" can be extracted from the video. The fingerprints are unique patterns of audio data or unique images that can be obtained from the video.

The fingerprints can include one or more unique sounds that can identify a geographical area. Audio fingerprints can be combined with video fingerprints, such as an image associated with the geographical area, to further verify the identified geographical area. Machine learning can be applied to the audio fingerprints to identify sounds that humans may not be able to perceived and/or distinguish. In addition, the person's identity can be verified from the video, for example from an image of the person on the video or from audio of the person on the video.

The systems and methods can also facilitate learning a pattern of geolocations for the person based on the unique sounds. The pattern of geolocations can be used to determine standard geolocations for the person and distinguish the standard geolocations from anomalous locations for the person. An identification of a geolocation as a standard geolocation, that is a geolocation that has been used previously by the person and for which the person may have a history, can be another aspect of verifying the person's identity. For example, in one embodiment, the system can learn the preferences for travel for an individual. If, for instance, the individual always spends two weeks each summer in the Caribbean, the system can learn this tendency and anticipate it when authenticating the individual. If the individual is authenticated during the summer months and the location indicates a tropical location in the Caribbean, the system can be programmed to anticipate this and respond appropriately, such as by requiring a lesser level of authentication than from an individual who never exhibited a consistent tendency to travel to the Caribbean during the summer months.

In one example of how the systems and methods can be used, the person can be travelling in a foreign country and realize that he/she forgot to notify her credit card company that she is travelling overseas. The person may be concerned that the credit card company will put a hold on her account due to possible fraudulent credit card activity in a geographical area not associated with the person. In addition, the person may not have cellular connectivity in the foreign country and cannot call the credit card company to inform the credit card company that she is travelling.

Using the systems and methods in this disclosure, the person can create a video of herself using her smartphone. The person can identify herself by name in the video and also include an audio message in the video, such as informing the person's credit card company that the person is travelling in a foreign country. The person may then be able to communicate the video (e.g., via a Wi-Fi or cellular network, such as in an email or text) to a location associated with the credit card company. As explained in detail later herein, audio and video fingerprints can be extracted from the video and can be used to identify a location for the video and to verify, at least in part, the identity of the person.

In another example of how the systems and methods can be used, an audio fingerprint can be used to authenticate a person making a telephone request for financial services. In this example, a call center at a financial institution, such as a bank, can receive a telephone-based request to transfer funds from a person's home equity account to the person's checking account. Because there is a possibility that the telephone-based request is not authentic and that someone has stolen credentials for the person and is masquerading as the person, the financial institution may need to authenticate the telephone-based request.

One way to authenticate the telephone-based request is to use a biometric authentication method, such as a voice print. However, the financial institution may not always have voice biometric information for all customers. Instead, the financial institution can obtain an audio fingerprint from the telephone-based request and obtain a location of the telephone-based request from background audio in the request. If the location turns out to be a location not compatible with a realistic usage pattern for the person, a determination can be made that the telephone-based request is fraudulent. For example, the location may be in a foreign country. However, for this example, the financial institution has recognized that the person made an ATM transaction in the United States just a few hours before the telephone-based request from the foreign country and it would not be possible for the person to travel from the location of the ATM transaction in the United States in time for the person to have made the telephone-based request in the foreign country.

FIG. 1 shows an example system 100 that supports validating a user's identity and location from audio and video data. System 100 includes a mobile electronic device 102, a client computer 104, a server computer 106 and a database 110. Server computer 106 includes an audio/video analysis module 108. More or fewer mobile electronic devices, server computers and databases can be used.

Mobile electronic device 102 is, for example, a smartphone or a tablet computer that can connect to server computer 106 over a wired or wireless connection. The smartphone or tablet computer includes a camera and microphone that can be used to capture video and audio. The smartphone or tablet computer can also include a software application for performing transactions at a financial institution.

Client computer 104 is a desktop computer or a laptop computer that can connect to server computer 106 over a wireless or wired connection. The desktop or tablet computer can include a camera that can be used to create videos and a microphone that captures audio. The desktop or tablet computer can also include a software application for performing transactions at the financial institution.

Server computer 106 is a server computer at a financial institution, for example at a bank, a credit card company, a mutual fund company, a brokerage company or other similar type financial institution. Although some of the examples provided herein are described with respect to a financial institution, the disclosed embodiments are applicable to other environments.

The server computer 106 can contain profile information for customers at the financial institution. The profile information can include biometric information, such as a fingerprint, a voice print, a retinal image and other biometric information for the customer.

Database 110 is a database that can be accessed by server computer 106. Database 110 can store customer financial information associated with server computer 106. Some of the profile information and other customer information can be stored on database 110.

The example audio/video analysis module 108 includes functionality to create audio and video fingerprints from a video that contains audio. As described in more detail later herein, an audio fingerprint can be created by sampling an audio signal in the video and producing vectors having data corresponding to obtained samples. A training dataset can be produced from the vectors. The training dataset can be compared to other datasets corresponding to known geographical areas and a best guess indicating a location of the video can be obtained. As described in more detail later herein, a video fingerprint can be obtained from analyzing images in the video and comparing the images to other images corresponding to known geographical locations.

Figure 2:
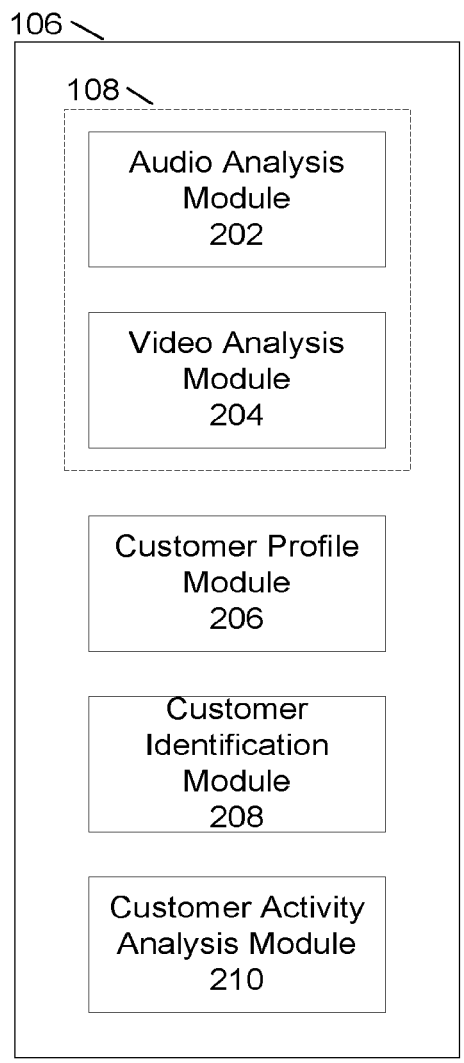
FIG. 2 shows example modules of the server computer of FIG. 1.

FIG. 2 shows example modules of server computer 106. The example server computer 106 includes the audio/video analysis module 108, a customer profile module 206, a customer identification module 208 and a customer activity analysis module 210. The audio/video analysis module 108 includes an audio analysis module 202 and a video analysis module 204. More, fewer or different modules are possible.

The example audio analysis module 202 samples an audio signal and attempts to identify a geographical location of the audio signal. As stated above herein and as described in more detail later herein, the audio analysis module 202 can be used to obtain an audio fingerprint from an audio stream. The audio stream can be from a video that contains audio, from a telephone call, from a digital data stream or from other sources. A geographical location corresponding to where the audio signal was created can be identified from the audio signal.

The example video analysis module 204 includes functionality for analyzing video images and identifying people, locations and events from the video images. For example, the video analysis module 204 may be able to identify one or more facial characteristics from a video image and identify a person by comparing the one or more facial characteristics with stored facial characteristics of clients of the financial institution (e.g., machine facial recognition).

Similarly, the video analysis module 204 may be able to identify one or more geographical features from a video image and identify a location by comparing the one or more geographical features with known features for different geographical areas. The video analysis module 204 may also be able to determine a context for an event from one or more of the video images. The context can include an identification of one or more people, a location and/or an object associated with the event.

The example customer profile module 206 includes information that provides a profile of a customer of the financial institution. The profile may include standard items such as name, address, age, occupation and income. The profile may also include information regarding travel history and purchasing history for the customer. The profile may further include travel notifications for the customer, such as indications by the customer that the customer is travelling to a certain geographical location at a certain time. Other profile information is possible.

The example customer identification module 208 receives data from the audio analysis module 202, the video analysis module 204 and the customer profile module 206 and attempts to identify a customer from the received data.

The example customer activity analysis module 210 analyzes customer activity and attempts to determine whether the customer activity is consistent with the customer profile, the audio and video fingerprints and previous customer activity as a means to minimize fraud. For example, if purchases are made using the customer's credit card in a foreign country and the financial institution has not received a notification that the customer is travelling in the foreign country, fraudulent use of the credit card may be suspected. As another example, if purchases are made using the customer's credit card in two different geographical areas within a short time frame, and the geographical areas are separated by a large distance, fraudulent use of the customer's credit card may be suspected. As a third example, when a video of the customer is received with a message from the customer that the customer is travelling in a foreign country, the customer activity analysis module 210 can use a geographical location obtained from the audio and video fingerprints to verify that the video is actually from the foreign country.

Figure 3:
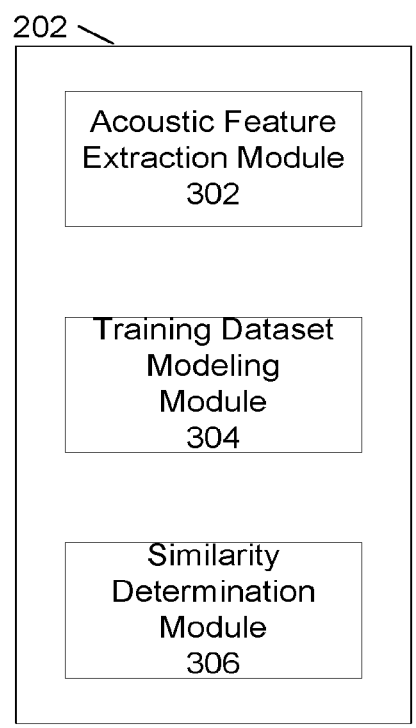
FIG. 3 shows example modules of the audio analysis module of FIG. 1.

FIG. 3 shows example modules of audio analysis module 202. Audio analysis module 202 includes an acoustic feature extraction module 302, a training dataset modeling module 304 and a similarity determination module 306.

In this embodiment, the example acoustic feature extraction module 302 obtains Mel Frequency Cepstral Coefficients (MFCCs) from an audio signal. The audio signal can be an audio signal contained within a video, an audio signal obtained from a telephone call, an audio signal obtained from live speech, or an audio signal obtained by other means. The MFCCs are coefficients that collectively make up a mel-frequency cepstrum (MFC). The MFC is a representation of a short-term power spectrum of a sound as transformed on a frequency scale of pitches known as a mel scale, where mel comes from the word melody. The MFCCs are used to parameterize the audio signal into acoustic feature vectors.

The acoustic feature extraction module 302 uses a process that takes 25 ms Hamming windows of the audio signal. A Fourier Transform is applied to each window to obtain a frequency spectrum. The frequency spectrum is mapped onto the mel scale using triangular overlapping windows. Logarithms are obtained of powers of frequencies on the mel scale. The logarithms of the powers represent acoustic vectors of log-energies. A Discrete Cosine Transform (DCT) is taken of the log-energies to produce the MFCCs.

The example training dataset modeling module 304 obtains a Gaussian Mixture Model (GMM) from the MFCCs derived from the acoustic feature extraction module 302. The GMM is a probabilistic model using discrete data points. The GMM is adapted from a Universal Background Model which contains GMMs obtained from training datasets for a large set of cities.

The example similarity determination module 306 generates a similarity scores between MFCC vectors in a GMM for each city. By matching similarity scores for a city with a similarity score for MFCC vectors from the audio signal, the similarity determination module 306 can identify a geographical location for the audio signal.

Figure 4:
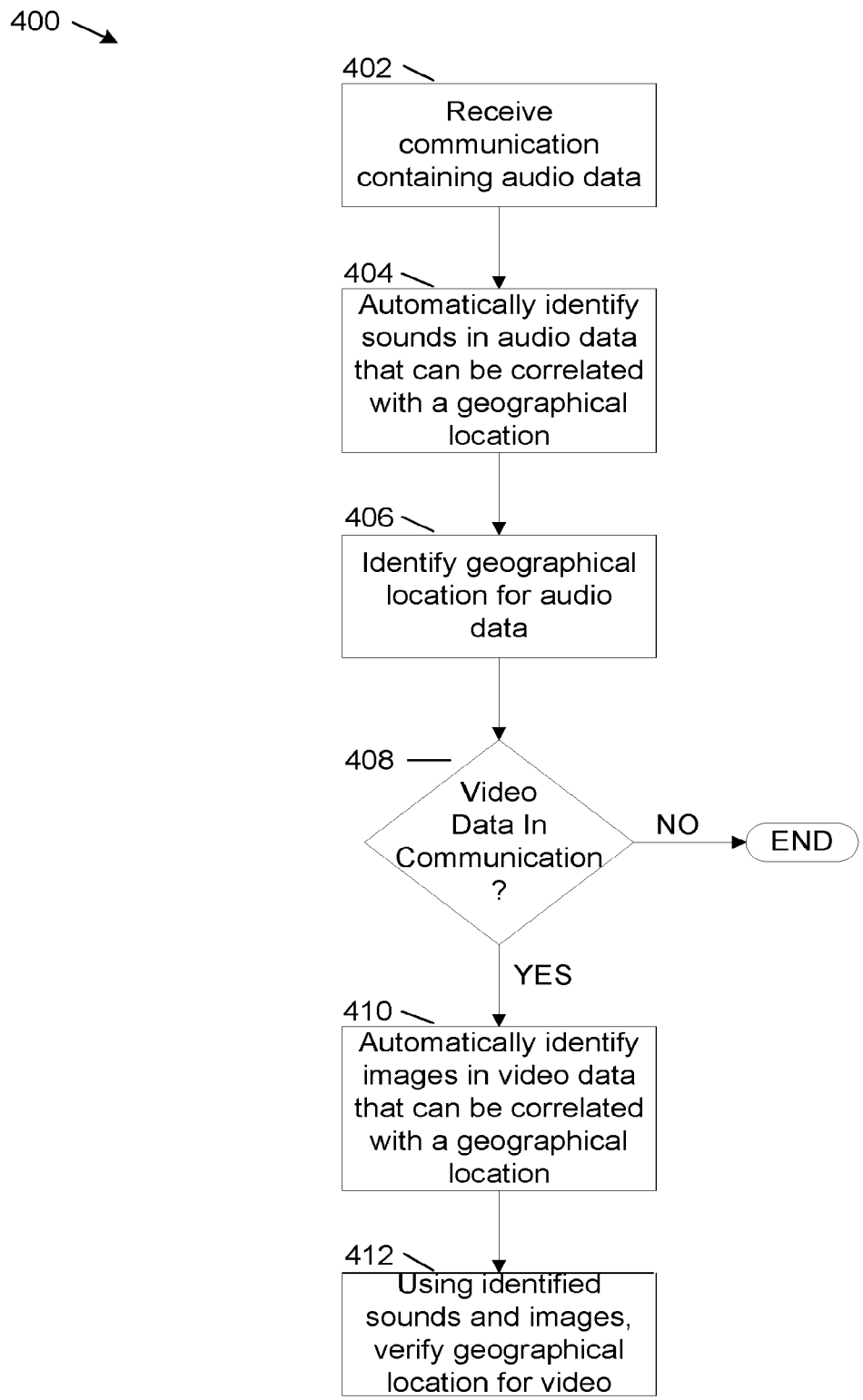
FIG. 4 shows a flowchart of an example method for identifying a geographical location from a communication.

FIG. 4 shows a flowchart of an example method 400 for identifying a geographical location from a communication. For the example method 400, the communication comprises a video that contains audio. In other examples, the communication can be an audio communication without video, such audio from a telephone call.

At operation 402, a communication is received at a server computer, for example at server computer 106. For operation 402, the communication is a video of a customer of a financial institution. This particular video (also known as a selfie) was made by the customer. The video includes an audio message from the customer stating that the customer is travelling in a foreign country and will be back in the United States at a specific date.

In one example, the video is included as an attachment to a message (e.g., a text or email message) that is sent from a smartphone, for example from mobile electronic device 102, of the customer to the server computer. In other examples, the message can be communicated in other manners. In this example, the message is formatted to include both an audio data set and a video data set. The audio data set and the video data set can be correlated so that the audio data can be replayed in sync with the video data. In addition, metadata associated with the audio and/or video can be included, such as a date/time stamp indicating the date and time of creation of the data file holding the audio and visual data sets. Other information can also be included, such as an account number for the individual at the financial institution.

For operation 402, the server computer is at a location that is accessible to mobile electronic device 102.

At operation 404, one or more sounds are automatically identified from audio data in the video. The sounds that are identified are sounds that can be correlated with a geographical location. These sounds constitute an audio fingerprint for the geographical location.

Some examples of sounds that can be correlated with a geographical location are a distinctive sound of an emergency vehicle in Paris, sounds from a bullet train in Tokyo and sounds from vehicular traffic in Manhattan. Other examples are possible.

Some sounds may not be distinguishable by humans. However, some of these sounds may be distinguishable by machines, such as by one or more computer algorithms on server computer 106. For example, in some circumstances, a machine based algorithm can identify San Francisco from the sound of birds chirping.

At operation 406, a geographical location is identified for the audio data. The geographical location can be identified from the audio fingerprint and from other sounds that can be included in the video. For example, the video can include sounds of people speaking in a predominant language, for example Japanese. Or the audio data can include someone speaking the name of the geographical location.

At operation 408, a determination is made as to whether the communication includes video data. For method 400, the communication includes video data (e.g., a selfie), so the communication is a video. In other cases, the communication can be only audio, such as a telephone call received at the server computer.

When a determination is made at operation 408 that the communication includes video data, at operation 410 one or more images that can be correlated with geographical data are automatically identified from the video data. Some examples of images that can be correlated with video data include the Empire State Building in New York City, the Golden Gate Bridge in San Francisco and the Eiffel Tower in Paris. Numerous other examples are possible.

At operation 412, the identified sounds and videos are used to verify the geographical location. For example, if the audio fingerprint suggests more than one possible geographical location but a video image confirms one of these geographical locations, the audio/video analysis module 108 can make a more accurate determination of the actual geographical location.

FIG. 5 shows a flowchart of the example operation 404 for automatically identifying sounds in audio data that can be correlated with a geographical location.

At operation 502, acoustic feature vectors are produced from an audio signal. In one implementation, acoustic feature vectors are produced by taking 25 ms windows for every 10 ms of the audio signal. For each 25 millisecond window, a Fourier Transform is applied to obtain a frequency spectrum. The acoustic feature vectors are MFCC feature vectors that are derived from the frequency spectrum. The acoustic feature vectors provide an accurate representation of the frequency spectrum of the audio signal.

At operation 504, a training dataset model is created. In one implementation, a city-independent model or Universal Background Model (UBM) is statistically trained using MFCCs from a large set of cities. Statistically training the UBM consists of mapping MFCC vectors from specific cities into a UBM space. City specific GMM models are then adapted from the UBM using city specific MFCC feature vectors.

At operation 506, similarity scores are generated for acoustic feature vectors for cities in the training dataset model. A similarity ratio can be computed for MFCC feature vectors. The similarity ratio can compare the MFCC vectors from the audio signal with other MFCC vectors in the UBM to determine how close the MFCC vectors from the audio signal comes to matching MFCC vectors from other cities in the UBM.

At operation 508, a geographical location is identified from the similarity scores. The geographical location, for example a city, can be identified from MFCCs for a specific known city that comes close to matching the MFCC vectors from the audio signal.

Figure 6:
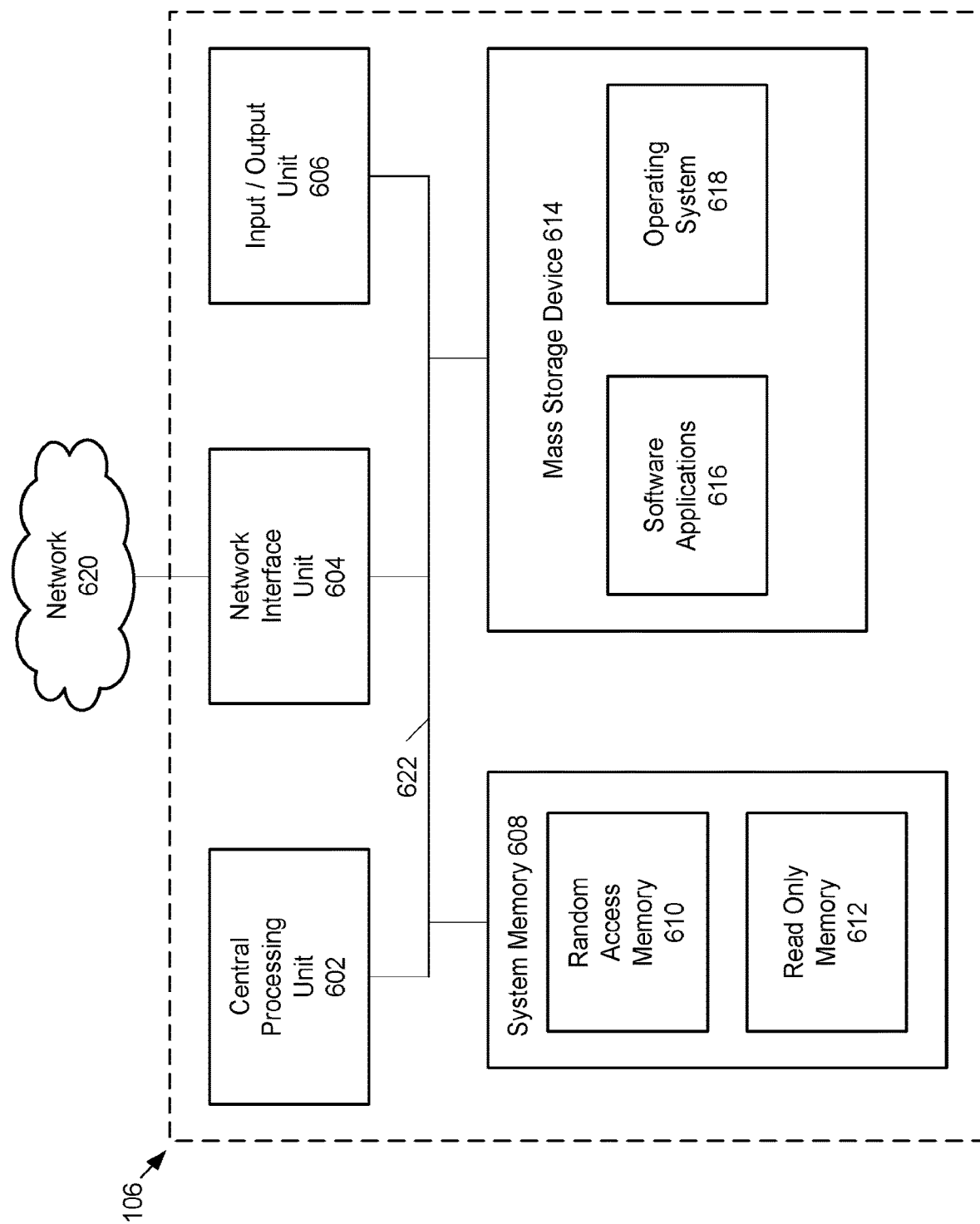
FIG. 6 shows example physical components of the server computer of FIG. 1.

As illustrated in the example of FIG. 6, server computer 106 includes at least one central processing unit ("CPU") 602, a system memory 608, and a system bus 622 that couples the system memory 608 to the CPU 602. The system memory 608 includes a random access memory ("RAM") 610 and a read-only memory ("ROM") 612. A basic input/output system that contains the basic routines that help to transfer information between elements within the server computer 106, such as during startup, is stored in the ROM 612. The server computer 106 further includes a mass storage device 614. The mass storage device 614 is able to store software instructions and data.

The mass storage device 614 is connected to the CPU 602 through a mass storage controller (not shown) connected to the system bus 622. The mass storage device 614 and its associated computer-readable data storage media provide non-volatile, non-transitory storage for the server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 106.

According to various embodiments of the invention, the server computer 106 may operate in a networked environment using logical connections to remote network devices through the network 620, such as a wireless network, the Internet, or another type of network. The server computer 106 may connect to the network 620 through a network interface unit 604 connected to the system bus 622. It should be appreciated that the network interface unit 604 may also be utilized to connect to other types of networks and remote computing systems. The server computer 106 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the server computer 106 can store software instructions and data. The software instructions include an operating system 618 suitable for controlling the operation of the server computer 106. The mass storage device 614 and/or the RAM 610 also store software instructions, that when executed by the CPU 602, cause the server computer 106 to provide the functionality of the server computer 106 discussed in this document. For example, the mass storage device 614 and/or the RAM 610 can store software instructions that, when executed by the CPU 602, cause the server computer 106 to display received data on the display screen of the server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for authenticating a financial transaction, comprising:
   receiving a communication from an individual, the communication including the individual's voice or image;
   confirming that the voice or the image matches the individual;
   using audio from the communication to correlate a geographical origin of the communication, including:
      extracting an audio pattern from the communication; and
      matching the audio pattern with a known pattern from a geographic region to correlate the geographic origin; and
   approving the financial transaction when the geographic origin of the communication corresponds to a geographic location of the financial transaction based upon the audio pattern.

2. The method of claim 1, further comprising denying the financial transaction when the geographic origin of the communication is inconsistent with a known attribute of the individual.

3. The method of claim 2, wherein the known attribute corresponds to a profile of the individual.

4. The method of claim 3, wherein the profile includes a travel history of the individual.

5. The method of claim 1, wherein the communication from the individual is a text message or an email message that includes an audio file or an audio/visual file.

6. The method of claim 1, wherein the communication from the individual is a telephone call.

7. The method of claim 1, wherein using audio from the communication to correlate a geographical origin of the communication comprises using one or more algorithms to compare patterns in the audio with audio patterns associated with specific locations.

8. The method of claim 1, wherein using audio from the communication to correlate a geographical origin of the communication comprises sampling the audio and extracting one or more acoustic vectors from the audio.

9. The method of claim 8, further comprising creating a dataset for a location using the one or more acoustic vectors from the audio.

10. The method of claim 9, further comprising:
comparing the dataset for the location with other datasets that are correlated with specific locations; and
when a determination is made that the dataset for the location is correlated with a specific location, designate the specific location as the geographic location of the financial transaction.

11. An electronic computing device comprising:
a processing unit; and
system memory, the system memory including instructions which, when executed by the processing unit, cause the electronic computing device to:
receive a communication from an individual relating to a financial transaction of the individual, the communication including the individual's voice or image;
confirm that the voice or the image matches the individual;
use audio from the communication to correlate a geographical origin of the communication, including to:
extract an audio pattern from the communication; and
match the audio pattern with a known pattern from a geographic region to correlate the geographic origin; and
approve the financial transaction when the geographic origin of the communication corresponds to a geographic location of the financial transaction based upon the audio pattern.

12. The electronic computing device of claim 11, wherein the instructions further cause the electronic computing device to deny the financial transaction when the geographic origin of the communication is inconsistent with a known attribute of the individual.

13. The electronic computing device of claim 12, wherein the known attribute corresponds to a profile of the individual.

14. The electronic computing device of claim 13, wherein the profile includes a travel history of the individual.

15. The electronic computing device of claim 11, wherein the communication from the individual is a text message or an email message that includes an audio file or an audio/visual file.

16. The electronic computing device of claim 11, wherein the communication from the individual is a telephone call.

17. The electronic computing device of claim 11, wherein using audio from the communication to correlate a geographical origin of the communication comprises using one or more algorithms to compare patterns in the audio with audio patterns associated with specific cities.

18. The electronic computing device of claim 11, wherein using audio from the communication to correlate a geographical origin of the communication comprises sampling the audio and extracting one or more acoustic vectors from the audio.

19. The electronic computing device of claim 18, wherein the instructions further cause the electronic computing device to:
create a dataset for a location using the one or more acoustic vectors from the audio data;
compare the dataset for the location with other datasets that are correlated with specific cities; and
when a determination is made that the dataset for the location is correlated with a specific location, designate the specific location as the geographic location of the financial transaction.

20. An electronic computing device comprising:
a processing unit; and
system memory, the system memory including instructions which, when executed by the processing unit, cause the electronic computing device to:
receive a communication from an individual relating to a financial transaction of the individual, the communication including the individual's voice or image;
confirm that the voice or the image matches the individual;
use audio from the communication to correlate a geographical origin of the communication, comprising:
sample the audio and extract one or more acoustic vectors from the audio;
create a dataset for a city using the one or more acoustic vectors from the audio data; and
when a determination is made that the dataset for the city is correlated with a specific location, designate the specific location as the geographic location of the financial transaction;
approve the financial transaction when the geographic origin of the communication corresponds to the geographic location of the financial transaction; and
deny the financial transaction when the geographic origin of the communication does not correspond to the geographical location of the financial transaction.

* * * * *